Patented Aug. 23, 1949

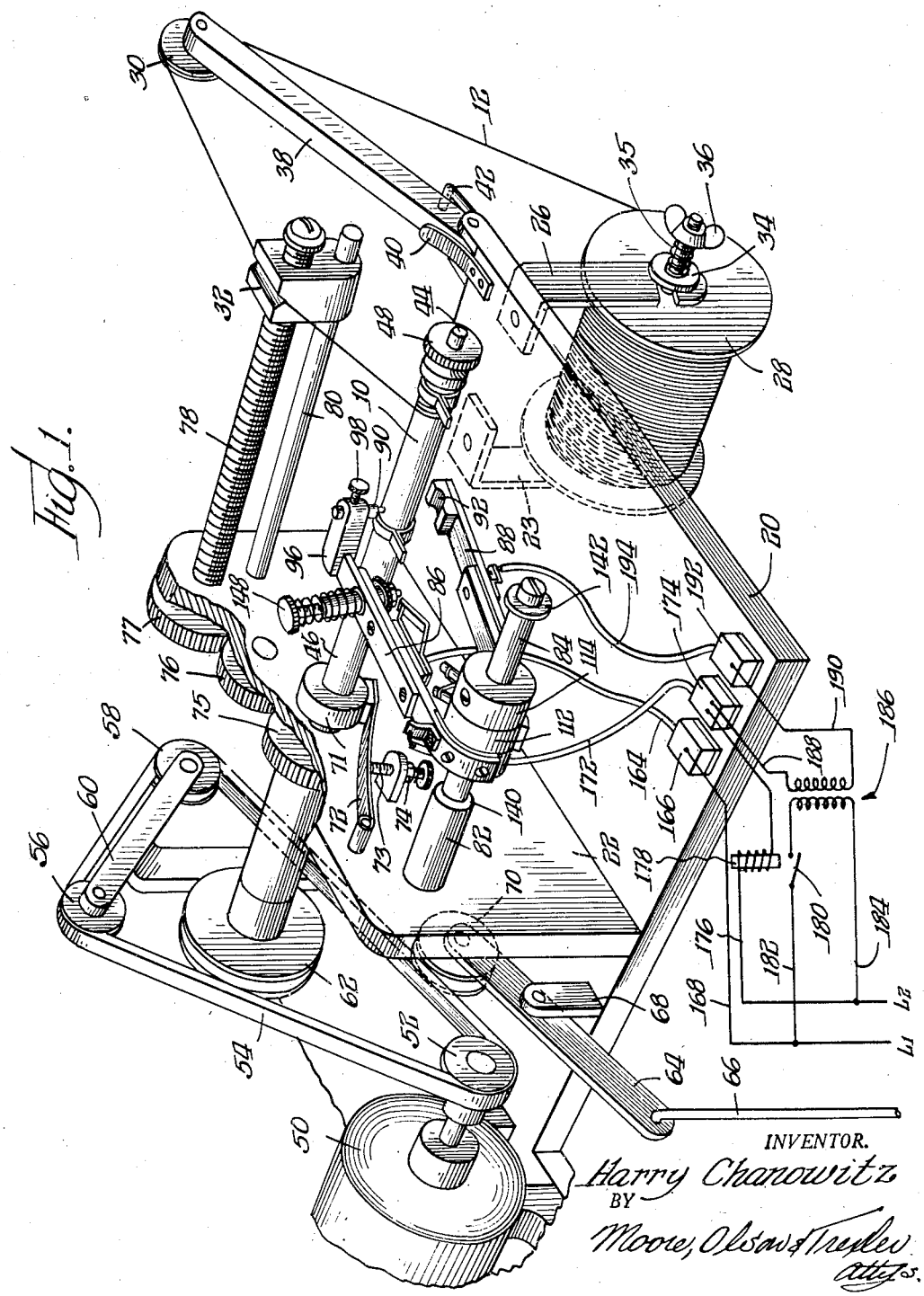

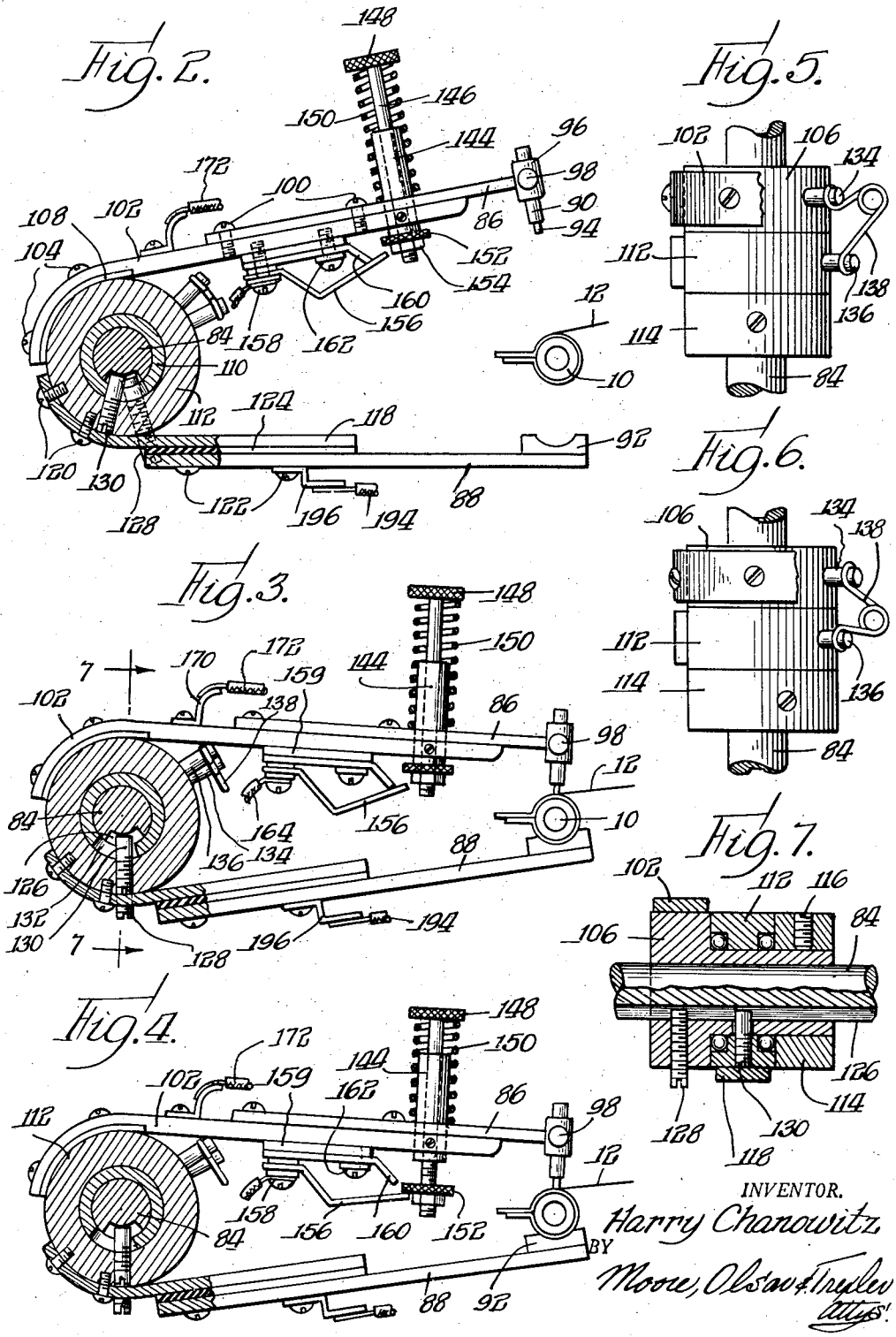

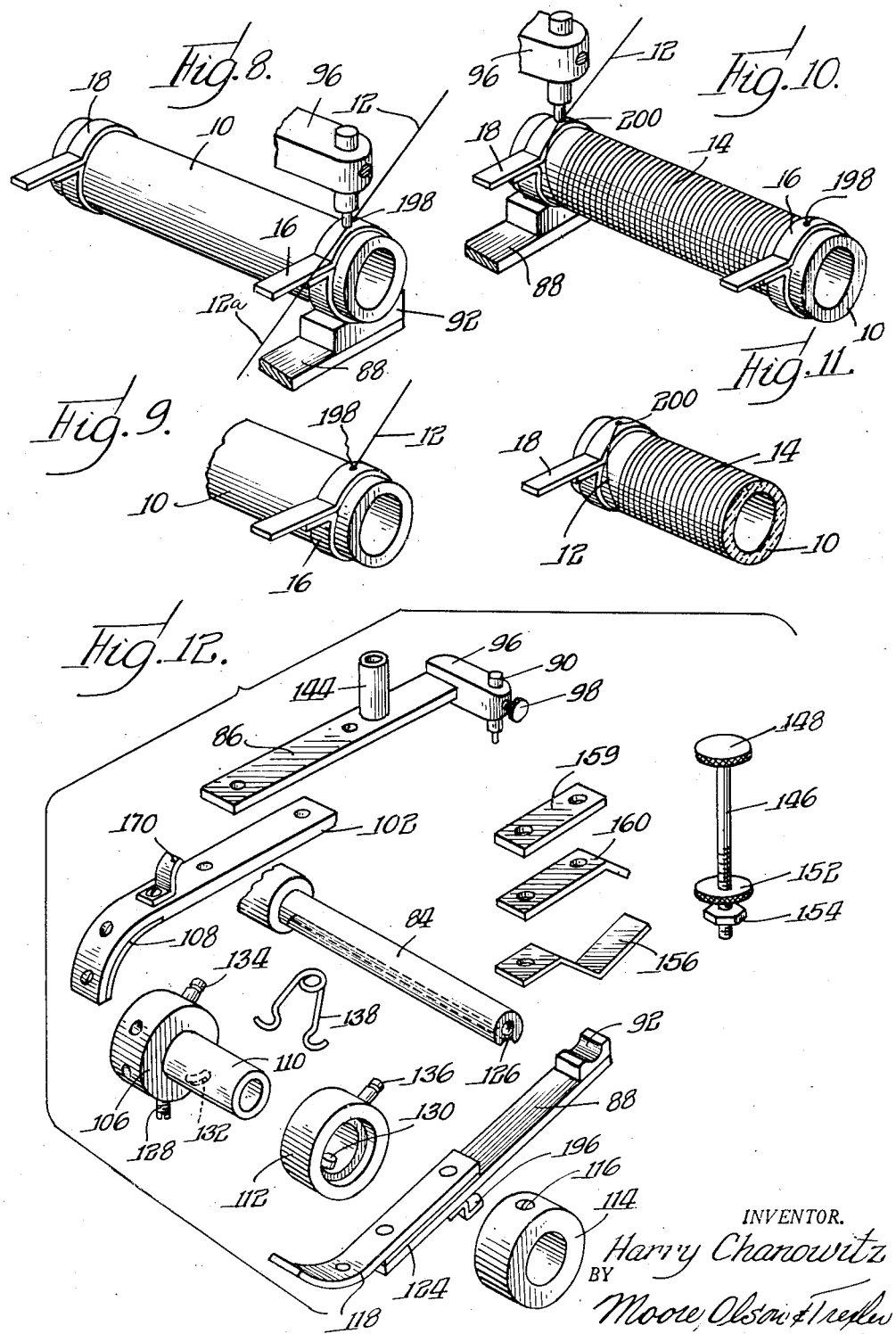

2,479,556

UNITED STATES PATENT OFFICE 2,479,556

WELDING METHOD AND APPARATUS

Harry Chanowitz, Chicago, Ill., assignor to David T. Siegel, Wheaton, Ill.

Application June 27, 1945, Serial No. 601,902

19 Claims. (Cl. 219—4)

1

This invention relates to welding methods and apparatus, and has reference particularly to the welding of wires to their associated connections in electrical devices and units such, for example, as resistors, coils, and the like.

It is an object of the invention to provide improved welding methods and apparatus, particularly for effecting welding operations of the type above set forth.

More specifically stated, it is an object of the invention to provide improved welding methods and apparatus, of the type defined, wherein relatively fragile and fine wires, or like articles to be welded, may be readily and effectively secured in welded position. In accordance with the invention, means and methods are provided for accurately predetermining the tension in the wire, or like work piece, prior to the welding operation; the pressure engagement between the work piece and the welding electrode also being accurately controlled during the welding operation, whereby to effect the welding of the fine and fragile work piece without flashing of the weld, or burning, or drawing of the work piece to be welded.

A further object of the invention is to provide improved welding methods and apparatus of the type defined, which are readily operable in connection with coil winding operations, whereby to be operable in connection therewith and as an incident thereto; means and methods being provided for insuring proper wire tension during the winding operations, preliminary to the welding operations, and during the welding operations, without interference or overlapping.

A still further object of the invention is to provide an improved welded coil structure, such for example as a resistor or the like.

Various other objects, advantages and features of the invention will be apparent from the following specification, when taken in connection with the accompanying drawings, wherein a preferred embodiment is set forth for purposes of illustration.

In the drawings, wherein like reference numerals refer to like parts throughout;

Fig. 1 is a general assembly view, in perspective, of an apparatus constructed in accordance with and embodying the principles of the invention;

Fig. 2 is a detail view of the electrode supporting arms of the work piece clamping unit, the arms being shown in open or disengaged position;

Fig. 3 is a view similar to Fig. 2, but showing

2 the arms in their work piece clamping position, prior to the welding operation;

Fig. 4 is a view similar to Fig. 3, showing the condition of the parts during the welding operation;

Figs. 5 and 6 are partial top views of the clamping unit, illustrating the position of the parts as in Figs. 2 and 3, respectively;

Fig. 7 is a vertical sectional view of the clamping unit and its support shaft, taken as indicated by the line 7—7 of Fig. 3;

Figs. 8–11 are detail illustrative views showing the work pieces, in the particular illustrative embodiment, in various stages of the winding and welding operations, and Fig. 12 is an exploded perspective view of the clamping unit, and associated parts.

This application is a continuation-in-part of my copending application, Serial No. 581,038, filed March 5, 1945, and entitled "Welding method and apparatus," now Patent No. 2,460,807, dated February 8, 1949.

In the welding of fine and fragile work pieces, such for example as the coil wires of electric resistors or the like, difficulties are presented in handling the work pieces, and in controlling the pressure engagement between the welding electrodes and the work pieces during welding, and also in controlling the tensile stresses in the work pieces themselves, prior to the application of the welding current. Even a slight arcing or flashing of the weld, or an excess tension in the work piece, will result in a burning of the work piece, or a drawing or stretching thereof, which in turn either breaks the work piece or otherwise results in an improper welded connection.

In accordance with the present invention means and methods are provided for accurately controlling the work piece tension prior to the welding operations, and also the pressure engagement of the electrodes with the work pieces during the welding operations, so as to effect the production of a satisfactory and reliable welded connection. Such means and methods are also so arranged and controlled that they may be employed in connection with wire coil winding operations, the welding operations being effected either prior to or after the coil winding, or both, as may be desired.

Satisfactorily operable means and methods, of the type defined, are provided in my aforesaid copending application. Further improvements are provided in accordance with the means and methods of the present structure.

The invention has been specifically illustrated as applied to the welding of wires to their associated terminals and contacts, in the manufacture of electrical resistance units, or coils, as the invention in certain of its aspects is particularly adapted for such use. It is to be understood, however, that various aspects of the invention may also be used in connection with other types of welding operations, such for example as those wherein similar problems of size, fragility, handling, et cetera, may be presented.

Referring more specifically to the drawings, in Fig. 1 there is shown a combined winding and welding apparatus for winding and welding the coil wire of an electrical resistor unit of known general type and construction. As best shown in Figs. 8–11, such resistor units conventionally comprise a cylindrical core or tube 10 of ceramic material, about which is wound a resistance wire, as indicated at 12, to form a coil 14. The ends of the core, in the particular unit shown, are provided with bands 16 and 18 forming the contact terminals for the unit, and to which the ends of the resistance wire 12 must be electrically secured. After the coil 14 has been formed, and the ends of the wire secured to the lugs 16 and 18, the outer surface of the unit may be covered with suitable coating material (not shown) which may be baked on, in a suitable high temperature oven.

Referring to Fig. 1, the apparatus shown comprises a main frame formed with a base plate 20 and a wall member 22, forming a support structure for the various operating elements of the apparatus. Vertically depending from the base plate 20 is a pair of brackets 23 and 26 forming a support for a supply spool 28 of the resistance wire. From the supply spool the wire is led over an idler guide pulley 30 and then over a shiftable guiding block 32 which operates to guide the wire, as the coil is formed, onto the core 10.

The supply spool is provided with a friction mechanism of any suitable form, to impart a predetermined tension to the wire as it is withdrawn from the supply spool. The friction mechanism shown for purposes of illustration comprises a friction collar 34, keyed to the supply spool axle, and urged by means of a compression spring 35 into engagement with the bracket 26, the spring tensioning being adjustable by a wing nut 36. The guide pulley 30 is mounted on the end of an arm 38 pivotally mounted on the frame plate 20, and normally urged by means of a leaf spring 40 into engagement with a stop bracket 42.

The core 10 of the resistor is arranged to be mounted upon the reduced end portion 44 of a mandrel 46 rotatably mounted upon the vertical support wall 22. The reduced mandrel end portion is threaded to receive a lock nut 48 which, after the core 10 has been slipped onto the end of the mandrel, may be clamped into engagement with the core, locking it to the mandrel for rotation therewith.

The mandrel is adapted to be driven by an electric motor as shown at 50, through suitable drive connections. More specifically, the end of the motor shaft is provided with a pulley 52 adapted to engage and drive a belt 54, which belt also passes over a pair of guide pulleys 56 and 58 mounted upon the support arm 60 forming a part of the frame structure. The mandrel shaft carries on its end a relatively large pulley 62 normally disengaged from the driving belt, in the position shown in Fig. 1. An operating lever 64, arranged to be actuated by a link 66 connected to a suitable foot treadle, is pivotally mounted upon a frame bracket 68, and carries on its end a pulley 70 disposed adjacent the driving belt 54. When the parts are in the position shown in Fig. 1, pulleys 70 and 62 are disengaged from the driving belt, and the mandrel will remain stationary. Counterclockwise movement of the operating lever 64 brings the pulley 70 into engagement with the driving belt which in turn forces the belt upwardly into engagement with pulley 62 whereby to effect mandrel rotation.

The mandrel shaft carries a collar 71 adapted to be engaged by a friction shoe carried at the end of a flexure spring 72 pivotally mounted in the frame wall 22. An adjustable screw 73, threaded through a wall bracket and arranged to be locked in adjusted position by a lock nut 74, may be adjusted upwardly to engage the flexure spring, so as to apply a predetermined frictional resistance to rotation of the mandrel, or retracted so as to permit the mandrel to rotate freely.

Fixed to the mandrel shaft for rotation therewith is a gear 75 which, through a meshing idler gear 76, drives a gear 77 secured to the end of an elongated threaded shaft 78 with which the guide block 32 is arranged to have threaded engagement. It will be seen that as the shaft 78 is rotated with the mandrel shaft 46, the guide block 32 will be longitudinally translated at a predetermined rate of travel, whereby to determine the pitch of the wire coil 14, as it is formed on the resistor core 10. To guide the block 32, and preclude the block from rotation, its lower portion is provided with an opening loosely receiving a fixed guide shaft 80 projecting from and supported by the support wall 22.

A stationary support axle 82 also projects from and is supported by the wall 22, the reduced end portion 84 of this axle forming a tool support for the electrode carrying arms of the work piece welding and clamping unit shown in Fig. 1, and also illustrated in detail in Figs. 2–7 and 12.

The welding unit comprises upper and lower support arms 86 and 88 carrying, respectively, the upper and lower electrode members 90 and 92 which are adapted for engagement with the work pieces to effect the welding operations. The upper electrode member, in the particular embodiment shown, is in the form of a stub shaft having a relatively small lower end projection 94 engageable with the wire 12. It is adjustably mounted within a bracket 96 carried at the end of the arm 86, by means of a set screw 98. The lower electrode 92 is provided with a groove or trough surface to engage either the band 16 or the band 18, as the case may be, over a relatively large contact area.

Toggle means is provided whereby the electrode support arms may be moved to and held in open or disengaged position, as shown in Fig. 2, or closed work piece engaging position, as shown in Fig. 3. To this end the upper support arm 86 is secured by screws 100 to an auxiliary arm 102 which is in turn secured by means of screws 104 to a collar 106, suitable insulation being interposed between the collar and auxiliary arm, as indicated at 108. The collar 106 is mounted on the reduced axle portion 84, for slidable movement therealong and limited rotational movement in respect thereto, as will presently be described. The collar 106 has an integral sleeve extension 110 on which is mounted a collar 112, for limited rotational movement in respect to the sleeve. The collar 112 is retained from axial displacement on the sleeve by means of a clamping or holding collar 114 adapted to be fixed on the end of the sleeve by means of a set screw 116. An auxiliary support arm 118 is fixed to the collar 112 by means of screws 120, this auxiliary support arm also being secured to the lower electrode support arm 88 by suitable means such as screws 122. Suitable insulation, as indicated at 124, is interposed between the arm portions 118 and 88, whereby to electrically insulate the latter.

The axle portion 84 is provided with a longitudinally extending slot or key-way 126 into which loosely projects a threaded stud 128 which is carried by the collar 106. Similarly the collar 112 is provided with a stud or pin 130 loosely projecting into the shaft key-way 126, this latter stud also projecting through a slot 132 of predetermined length circumferentially of the sleeve 110.

The collar 106 also carries a pin 134 and the collar 112 similarly carries a pin 136 between which is suspended a compression spring 138. As the electrode support arms are manually moved between open and closed positions, as respectively shown in Figs. 5 and 6, the pins 134 and 136 are moved past each other, their positions being relatively reversed in a circumferential direction. The spring 138 tends to separate the pins circumferentially, and thus tends to urge the electrode arms apart when they are in open position, or together when they are in closed position, in the nature of a toggle.

The pin 130 carried by the collar 112 engages one end of the slot 132 in sleeve 110, whereby to limit the separation of the electrode support arms under the urging action of the spring 138, as shown in Fig. 2. When the arms are thus in open position, the pin 130 is displaced slightly from one side of the key-way 126, whereas the pin 128 is displaced slightly from the other side of the key-way, so that there is no binding action between the pins and the axle shaft 84. Accordingly with the support arms in open position, the entire clamping unit may be manually shifted, freely, between the abutment limits 140 and 142, Fig. 1, to any longitudinal position along the axle 84, so as to align the electrodes properly with the work pieces. The clamping structure is held from rotation as a unit, relative to the axle, by reason of the fact that one or the other of the pins will engage the sides of the key-way if attempt is made to rotate the clamping structure materially from the position shown in Fig. 2.

As the electrode support arms are moved into closed or work piece engaging position, as shown in Fig. 3, the pins 130 and 128 move angularly toward each other into substantial axial alignment within the axle key-way, there being sufficient clearance between the pins and the key-way side walls so as to permit the electrodes to engage and adapt themselves to the precise positioning of the work pieces.

It will thus be seen that the tension of the spring 138 determines the magnitude of the pressure engagement between the electrodes and the work pieces when the electrode support arms are brought into work piece engaging position, as shown in Fig. 3. In accordance with the present invention, this spring tension is employed only to predetermine the stress or tension which will be imparted to the wire 12 prior to the welding operation. Additional means is provided for applying a predetermined different or greater pressure engagement between the welding electrode 90 and the engaged wire during the welding, and means is provided for automatically initiating the welding operation only when such predetermined pressure engagement is reached.

More specifically, it will be seen that the upper electrode support arm 86 has fixed thereto a bushing 144 within which is slidable a vertically reciprocable plunger 146 provided at its upper end with an operating button portion 148. A compression spring 150 bears between the arm and the button so as normally to urge the plunger into its uppermost position, as shown in Figs. 2 and 3.

The lower end of the plunger has threaded thereon a contact nut 152 locked in adjusted position by means of a lock nut 154. When the plunger is manually depressed against the action of the spring, as shown in Fig. 4, the contact nut is arranged to engage and make electrical contact with a resilient spring contact member 156 mounted in an insulated manner upon the auxiliary arm member 102 by means of a screw 158 and an insulation block as indicated at 159. Normally, and when not engaged by the contact nut, the spring contact member 156 resiliently engages a stop member 160 also suitably mounted in insulated manner upon the auxiliary arm, as by means of a screw 162.

The contact members 152 and 156 are employed as switch means for controlling the transmission of the welding current to the welding electrodes. To this end, and as diagrammatically indicated in Fig. 1, it will be seen that the contact member 156 is connected by means of a wire 164 to a terminal block 166, which is in turn connected by means of a wire 168 to one power line of a suitable source of electrical power supply. The auxiliary support arm 102 carries a bracket 170 to which is connected a wire 172 leading to a terminal block 174. A wire 176 leads from this terminal block to the other power line of the source of supply, a solenoid 178 being connected in the circuit so as to be energized when the contact nut 152 electrically connected to wire 172 and the contact switch arm 156 electrically connected to the wire 164 are engaged.

The solenoid 178 when energized causes the closing of a switch 180 disposed in the circuit of lines 182 and 184 leading from the power lines to the primary of a suitable welding transformer and control apparatus as diagrammatically indicated at 186. The secondary of the welding transformer is connected by means of lines 188 and 190 to the terminal blocks 174 and 192. The terminal block 174 is electrically interconnected with the upper electrode by means of the wire 172, previously described, whereas the terminal block 192 is electrically interconnected with the lower electrode by means of a wire 194 connected to a bracket 196 associated with the lower electrode support arm structure. It will be seen that by reason of the connections described, as the contact members 152 and 156 are engaged, electric current will be transmitted from the welding transformer to the welding electrodes. The apparatus 186 may preferably comprise a synchronous half-cycle electronic welder, for supplying an accurately controlled welding current, of short duration, to the welding electrodes.

In the operation of the apparatus, the operator first fixes the work piece core member 16, with its attached terminal lugs 16 and 18, onto the mandrel 46, while the latter is stationary, by means of the thumb screw 48. With one hand, for example the right hand, the operator then draws the resistance wire 12 across the terminal lug or band 16, as shown in Fig. 8, and with his left hand causes the electrode support arms 86 and 88 to be moved relatively toward each other so as to engage the pin electrode 90 with the wire at its point of contact with the band 16, and the trough or support electrode 92 with the lower portion of the band, as shown in Figs. 3 and 8. The operator then releases the end of the wire from his right hand and grasps the control switch button 148. Immediately as the operator releases the end of the wire 12, the wire will automatically assume a tension determined by the strength of the spring 138. More specifically, the operator may have pulled relatively strongly upon the wire, and against the action of the friction means 34 associated with the winding spool, during the placement of the wire under the pin electrode. However, as the wire end is released, as stated, the wire will slip back until the tension therein is just sufficient to be equalized by the pressure engagement of the pin electrode against the wire, as determined by the strength of the spring 138. By this means an accurately predetermined and desired tension is imparted to the wire prior to the welding operation.

As the operator now depresses the button 148, and upon engagement of the contact members 152 and 156, the welding current will be applied. It will be seen that the pressure engagement between the upper electrode and the wire, at the instant of welding, is now determined by the tension of spring 138 augmented by the tension of the spring 150, which may be selected so as to apply a predetermined and desired greater pressure engagement between the electrode and wire work piece during welding. As the welding current is applied, the operator preferably lifts upwardly on the lower electrode support arm, for example with the fingers of his left hand, so as to maintain firm contact between the lower electrode and the work piece. The magnitude of this pressure is not critical, so long as it is adequate. The pressure engagement between the upper electrode and the fragile wire, which is critical, is controlled solely by the springs 138 and 150, and thus is invariable and maintained at the desired magnitude. Preferably the spring 150 is constructed so that the pressure exerted thereby is not materially increased should the operator depress the plunger 146 somewhat past the point of engagement between switch contact members 152 and 156.

Upon the application of the welding current a weld as indicated at 198, Fig. 8, will be formed between the wire 12 and the band 16. The end 12a of the wire may now be broken off, as indicated in Fig. 9, this operation serving to test the fact that the weld has been made. The electrode clamping unit is then moved to open position, as shown in Fig. 2, and rotation of the mandrel initiated by operation of the lever 64, as previously described. Under guidance of the guide block 30, the wire 12 will be coiled upon the core 10 to form the wire coil 14, as shown in Fig. 10. During the winding operation, the winding tension in the wire will be determined by the tension of spring 35 associated with the supply spool friction mechanism.

Upon completion of the winding operation, the operator disengages the mandrel drive, and stops the mandrel rotation in predetermined position, as shown in Fig. 10. If the brake device 72 is being used, the mandrel will be frictionally held thereby in stationary position. The operator then pulls the wire 12 across the band 18, as shown in Fig. 10, pulling slack from the supply spool. Thereupon the electrodes are again brought into engagement with the work pieces, as also shown in Fig. 10, and the operator releases his grip upon the wire 12. As the wire is released, the slack between the welding station and the supply spool permits the wire to slip under the electrode, under control of the pressure of spring 138, so as to predetermine the tension in the wire between the welding station and the body of the coil 14 to the accurately determined desired amount. It will be seen that this tension adjustment is effected without in any way loosening or impairing the formation of the coil 14. The welding operation is thereupon effected, as previously described in reference to the band 16, so as to form the weld as indicated at 200 in Fig. 10 between the wire and the band 18; after which the wire end is broken off as shown in Fig. 11, and the winding and welding operations are complete.

The use of the friction device 72 is optional and, where not used, the operator may manually hold the mandrel from rotation, as for example by suitably gripping the collar 71.

It will be seen that the spring 138 controls the preliminary tensioning of the work piece wire 12 in connection with the preparation of the work piece for the welding operation. The springs 138 and 150 collectively control the greater electrode and work piece pressure engagement during the welding operation; whereas the spring 35 controls the frictional tension in the wire during the coil winding operations. By this means all required pressures and tensions are accurately controlled. The electrode support arm 86 is of low inertia, and is resiliently urged by both springs 138 and 150 into pressure engagement with the work piece as the welding progresses, and so as to follow the contours of the wire as the heating and shaping of the weld occurs. The application of the welding current is controlled so as to take place only as the springs become operative. By reason of the mechanism provided fragile and delicate work pieces, such for example as relatively fine wires on the order of .001 inch or less in diameter, may be effectively welded; without arcing or burning of the wire at the welded joint, or without the drawing or breaking thereof as the weld is formed, due to excess tension in the work piece. The malformation of the work piece, or the weld, due to excess internal stress in the work piece, is precluded. The preliminary tensioning of the wire, as described in connection with the forming of the weld 200, may be effected without loosening or impairing the formation of the wire coil 14. The friction device 34 may be adjusted to control the winding tension without disrupting the accurately predetermined welding conditions.

In certain instances the wire might be welded to the platform or projecting portions of the terminal bands 16 and 18, in which event the lower electrode may preferably engage directly with the lower projection surface.

It is obvious that various changes may be made in the specific embodiment set forth without departing from the spirit of the invention. The invention is accordingly not to be limited to the precise embodiment shown and described, but only as indicated in the following claims.

The invention is hereby claimed as follows:

1. The method of welding a filament or like elongated work piece to a cooperative work part which comprises predetermining the tension in the filament to a predetermined value, applying an electrode against the filament to compress it onto the work part with a predetermined force, and welding the filament to the work part by said electrode while maintaining the filament stationary and while maintaining the tension therein at such predetermined value.

2. The method of welding a filament or like elongated work piece to a cooperative work part which comprises predetermining the tension in the filament to a predetermined value by permitting it to slip under an electrode engageable with the filament at predetermined pressure toward a point of fixed anchorage, and thereafter welding the filament to said work part by means of said electrode while maintaining the filament stationary and while maintaining the tension in the filament at such predetermined value.

3. The method of welding a filament or like elongated work piece to a cooperative work part which comprises predetermining the tension in the filament to a predetermined value by permitting it to slip under an electrode engageable with the filament at predetermined pressure toward a point of fixed anchorage, increasing the pressure engagement of the electrode against the filament, and thereafter welding the filament to said work part by means of said electrode while maintaining the tension in the filament at said predetermined value and the pressure of the electrode at said increased pressure.

4. The method of making an electrode unit which comprises pressure engaging an electrode against an electric wire superposed onto a connector lug to which the wire is to be secured, predetermining the tension in the wire to a predetermined value by permitting it to slip under the electrode toward a point of fixed anchorage, increasing the pressure engagement of the electrode against the wire, and thereafter applying welding current to the electrode to effect the formation of a weld between the wire and said connector lug.

5. The method of welding and winding a filament or like elongated work piece onto a body member which comprises predetermining the tension in the filament to a predetermined value, welding the filament to the body member while maintaining the tension therein at such predetermined value, and forming the filament into a coil on the body member while maintaining the filament tension at a different predetermined value.

6. The method of welding and winding a filament or like elongated work piece onto a body member which comprises predetermining the tension in the filament to a predetermined value by permitting it to slip under an electrode engageable with the filament at predetermined pressure toward a point of fixed anchorage, welding the filament to the body member while maintaining the tension therein at such predetermined value, and forming the filament into a coil on the body member while maintaining the filament tension at a different predetermined value.

7. The method of welding and winding a filament or like elongated work piece which comprises predetermining the tension in the filament to a predetermined value by permitting it to slip under an electrode engageable with the filament at predetermined pressure toward a point of fixed anchorage, increasing the pressure engagement of the electrode against the filament, welding the filament at such increased pressure engagement, and forming the filament into a coil while maintaining the filament tension at a different predetermined value.

8. The method of welding and winding a filament or like elongated work piece onto a body member which comprises predetermining the tension in the filament to a predetermined value, welding the filament to the body member while maintaining the tension therein at such predetermined value, breaking off the filament on one side of the weld by applying tension to the filament in respect to the weld, and forming the filament on the other side of the weld into a coil on the body member while maintaining the filament tension at a different predetermined value.

9. The method of making a wire coil electrical unit which comprises mounting a connector lug in predetermined fixed position upon a core unit, engaging a wire with said connector lug, predetermining the tension in the wire to a predetermined value, welding the wire to the connector lug while maintaining the tension therein at such predetermined value, and winding the wire upon the core unit while maintaining the wire tension at a different predetermined value.

10. The method of making a wire coil electrical unit which comprises mounting a pair of connector lugs in predetermined fixed position upon a core unit, engaging an electrode against a wire superposed upon one of said connector lugs at predetermined pressure, tensioning the wire to a predetermined value by permitting it to slip under the electrode toward a point of fixed anchorage, increasing the pressure engagement of the electrode against the wire, welding the wire to said engaged connector lug, forming the wire into a coil upon said core unit while maintaining a predetermined tension in the wire, and thereafter welding the wire to the other of said connector lugs.

11. A welding apparatus comprising a work support, a tool support, an electrode carrying arm shiftably mounted on the tool support, means adapted when energized to urge the electrode arm toward said work support at a fixed predetermined pressure, and separate means comprising a manual control handle and a spring interconnecting the handle and the electrode arm operable on manipulation of the handle to increase the pressure engagement of the electrode arm toward said work support.

12. A welding apparatus comprising a work support, a tool support, an electrode carrying arm shiftably mounted on the tool support, means including a spring member adapted when energized to urge the electrode arm toward said work support at a fixed predetermined pressure, and separate means including a manual control handle and a second spring interconnecting the handle and the electrode arm adapted when energized to increase the pressure engagement of the electrode arm toward said work support.

13. A welding apparatus comprising a work support, a tool support, an electrode carrying arm shiftably mounted on the tool support, means adapted when energized to urge the electrode toward said work support at a fixed predetermined pressure, separate means including a manual control handle and a spring interconnecting the handle and the electrode arm adapted when energized to increase the pressure engagement of the electrode arm toward said work support, and means for applying welding current to the electrode including a current initiating switch controlled by the operation of said pressure increasing means.

14. A welding apparatus comprising a work support, a tool support, an electrode carrying arm mounted upon said tool support for axial movement in respect thereto and for pivotal movement toward the work support, a first means for pivoting said arm toward the work support at a predetermined pressure, and a second means adapted when operated to urge the arm toward the work support at an increased pressure.

15. A welding apparatus comprising a work support, a tool support, an electrode carrying arm mounted upon said tool support for axial movement in respect thereto and for pivotal movement toward the work support, a first means for pivoting said arm toward the work support at a predetermined pressure, and a second means adapted when operated to urge the arm toward the work support at an increased pressure, and welding current control means operated by said pressure increasing means.

16. A welding apparatus comprising a work support, a tool support, an electrode carrying arm mounted on the tool support for axial movement in respect thereto and for pivotal movement toward the work support, a spring arranged when energized to urge said arm pivotally toward the work support at predetermined pressure, an operating member carried by said arm, spring means reacting between said operating member and the arm whereby as the arm is operated additional pressure is thereby applied urging the arm pivotally toward the work support, and welding current control means operated by said operating member.

17. A welding and winding apparatus comprising a rotatable mandrel, a tool support, a pair of electrode carrying arms pivotally mounted on the tool support, spring means for urging the arms toward each other into clamping engagement with a work piece carried by the mandrel, means for rotating the mandrel, an operating member carried by one of said arms, spring means reacting between said operating member and said arm whereby as the operating member is actuated said spring means urges the arm toward the mandrel at increased pressure, and welding current control means actuated by said operating member.

18. The method of welding and winding a filament or like elongated work piece onto a body member which comprises predetermining the tension in the filament to a predetermined value, applying an electrode against the filament to compress it onto the body member with a predetermined force, welding the filament to the body member by said electrode while maintaining said filament under said predetermined tension and while the electrode remains applied thereto with said predetermined force, and forming the filament into a coil on the body member while maintaining the filament tension at a different predetermined value.

19. A welding apparatus comprising a work support, a tool support, an electrode carrying arm mounted on the tool support for axial movement in respect thereto and for pivotal movement toward the work support, a spring arranged when energized to urge said arm pivotally toward the work support at predetermined pressure, an operating member carried by said arm, and spring means reacting between said operating member and the arm whereby as the member is operated additional pressure is thereby applied urging the arm pivotally toward the work support.

HARRY CHANOWITZ.

REFERENCES CITED

The following references are of record in the file of this patent:

UNITED STATES PATENTS

| Number | Name | Date |
|---|---|---|
| 1,305,690 | Coyer | June 3, 1919 |
| 1,323,621 | Edwards | Dec. 2, 1919 |
| 1,448,566 | Mueller | Mar. 13, 1923 |
| 1,579,721 | Leslie | Apr. 6, 1926 |
| 2,163,590 | Ganahl et al. | June 27, 1939 |
| 2,383,695 | Thacker | Aug. 28, 1945 |

FOREIGN PATENTS

| Number | Country | Date |
|---|---|---|
| 430,768 | Great Britain | June 25, 1935 |